United States Patent Office 3,377,908
Patented Apr. 16, 1968

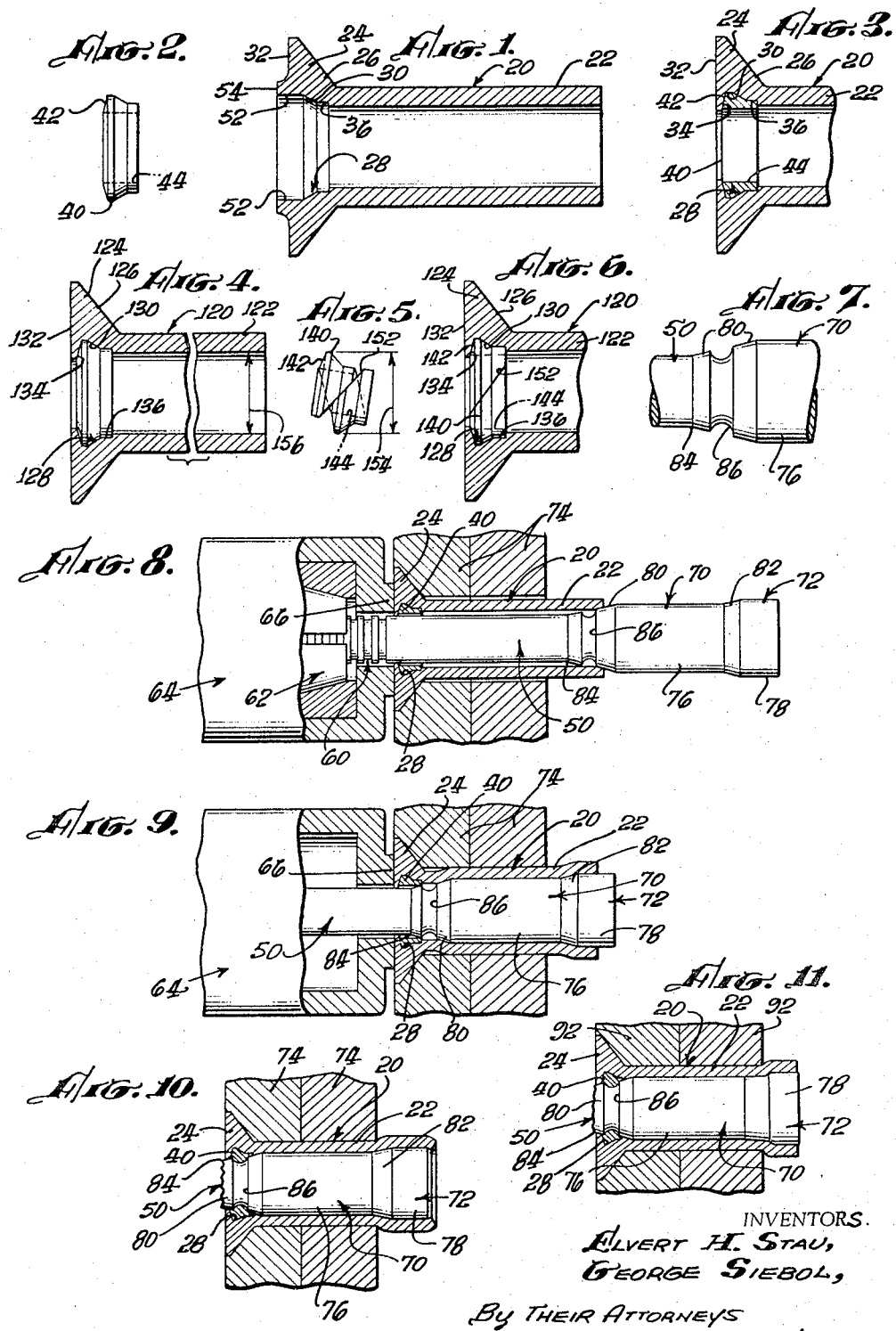

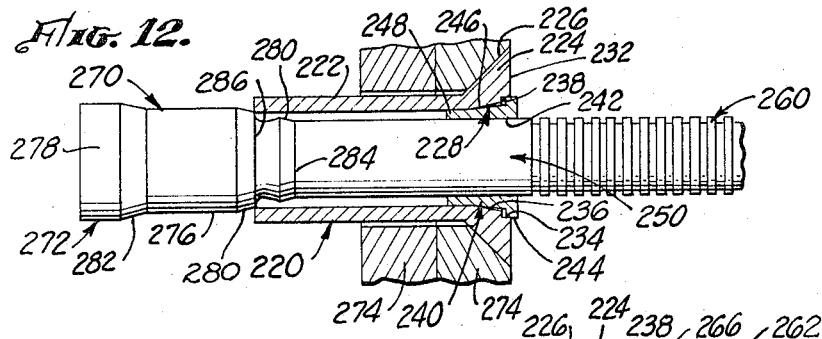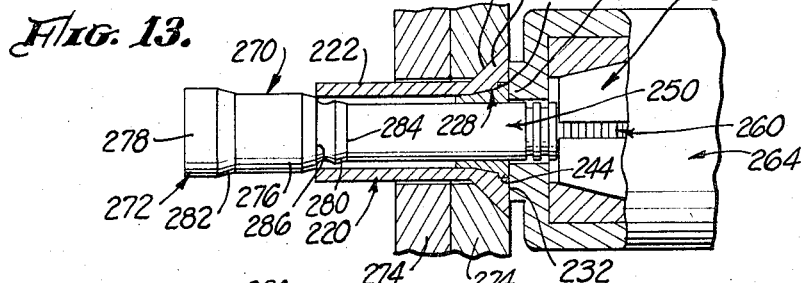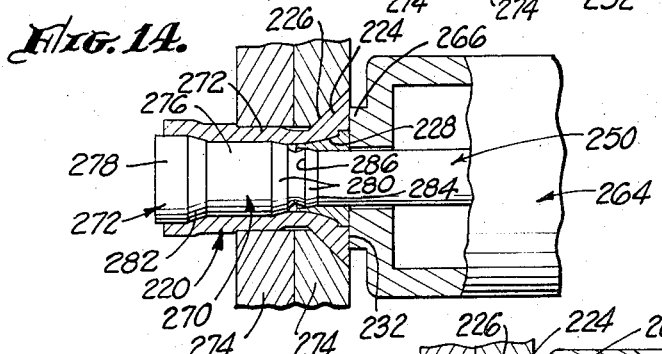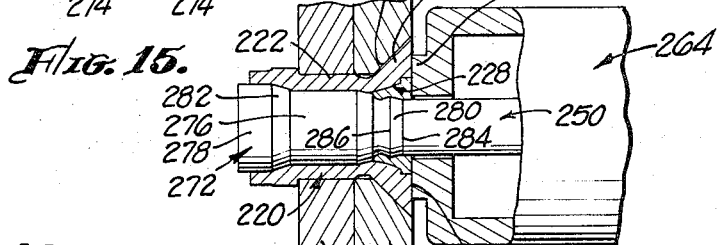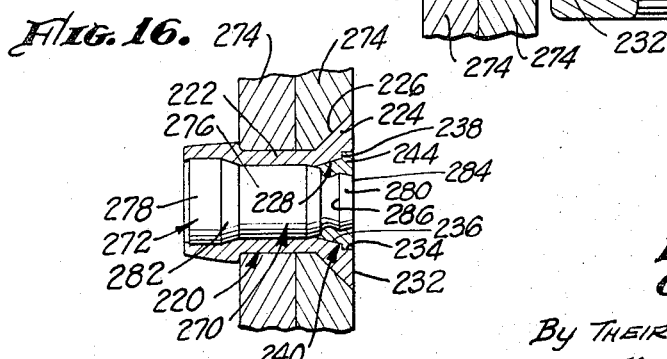

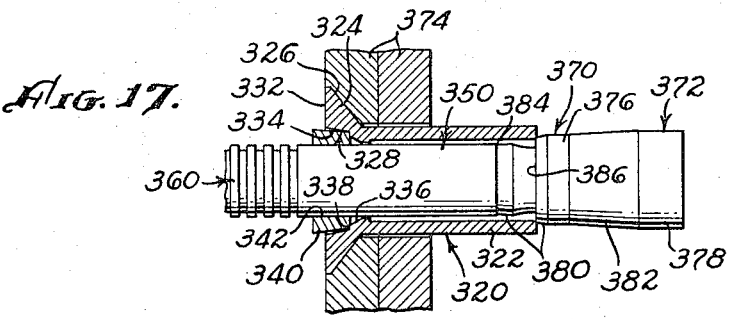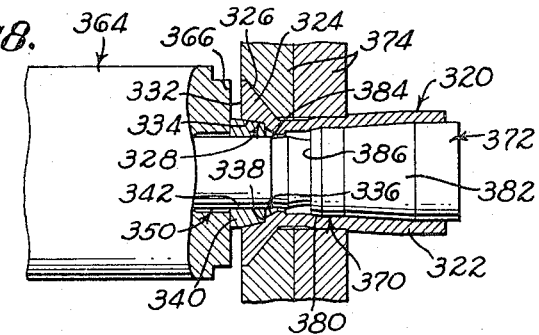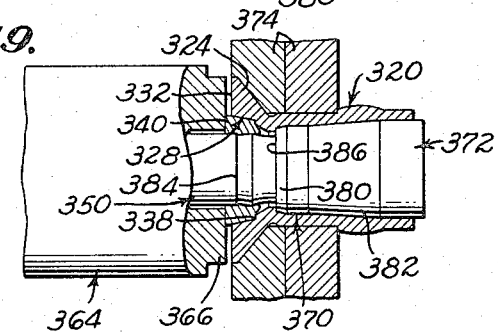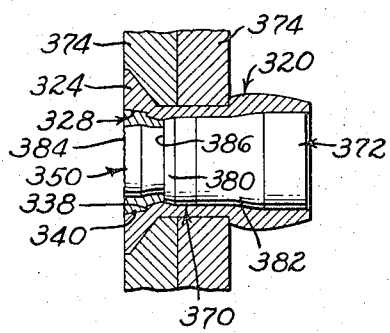

3,377,908
BLIND RIVET ASSEMBLY WITH LOCKING MEANS
Elvert H. Stau, Alhambra, and George Siebol, Orange, Calif., assignors to Olympic Screw & Rivet Corporation, Downey, Calif., a corporation of California
Continuation of application Ser. No. 466,521, June 24, 1965, which is a continuation-in-part of application Ser. No. 382,294, July 13, 1964. This application Apr. 10, 1967, Ser. No. 629,835
4 Claims. (Cl. 85—78)

ABSTRACT OF THE DISCLOSURE

A blind rivet assembly comprising a tubular rivet and a pin capable of being pulled axially of the tubular rivet to set same. A locking collar disposed in an internal annular recess in the head of the tubular rivet and in an external annular groove in a tapered annular shoulder on the pin serves to lock the pin and the tubular rivet together after setting of the tubular rivet by the pin. Setting of the blind rivet assembly is controlled solely by deformation of the locking collar into the internal annular recess in the rivet head and the external annular groove in the pin.

Cross-references to related applications

This application is a continuation of our copending patent application Ser. No. 466,521, filed June 24, 1965, and now abandoned, which, in turn, is a continuation-in-part of our then copending patent application Ser. No. 382,294, filed July 13, 1964, and now abandoned.

Background of invention

The present invention relates to general to a blind rivet assembly comprising a tubular rivet settable by a pin adapted to be pulled axially of the tubular rivet, and, more particularly, to a blind rivet assembly of this character having means for automatically locking the pin to the tubular rivet upon setting of the latter.

Considering the type of blind rivet assembly to which the invention relates more specifically now for background purposes, the tubular rivet comprises a sleeve provided with a head at one end, the pin extending through the tubular rivet and being provided adjacent the head thereof with grippable means engageable by a pull-type gripping means of a suitable riveting tool. The pin is provided at its other end, and adjacent the blind end of the tubular rivet, with means for expanding the tubular rivet into engagement with the work and for enlarging the blind end of the sleeve of the tubular rivet for seating relation with the blind side of the work. The means for expanding the tubular rivet into engagement with the work includes a shank of larger diameter than the pin and joined to the pin by a tapered annular shoulder converging from the shank toward the accessible end of the pin.

Summary and objects of invention

A primary object of the invention is to provide means for locking the pin and the tubular rivet together, after setting of the tubular rivet by the pin, which comprises a locking collar disposed in an internal annular recess in the head of the tubular rivet and in an external annular groove in the tapered annular shoulder on the pin.

Another and important object of the invention is to provide a locking collar of permanently deformable material which initially encircles the pin and extends radially outwardly into the internal annular recess in the head of the tubular rivet, and which is deformable into the external annular groove in the tapered annular shoulder on the pin when the pin is displaced axially relative to the tubular rivet sufficiently to register the external annular groove in the tapered annular shoulder on the pin with the internal annular recess in the head of the tubular rivet.

Still another important object of the invention is to provide a structure of the foregoing nature wherein the volume of the locking collar is substantially equal to the sum of the volumes of the internal annular recess in the head of the tubular rivet and the external annular groove in the tapered annular shoulder of the pin.

With the foregoing construction, the material of the locking collar substantially completely fills the internal annular recess in the head of the tubular rivet and the external annular groove in the tapered annular shoulder on the pin to lock the pin to the tubular rivet in a positive and reliable manner, which is an important feature.

Another important feature of the foregoing construction is that the locking collar, by substantially completely filling the internal annular recess in the head of the tubular rivet and the external annular groove in the tapered annular shoulder on the pin, serves as a positive stop preventing axial movement of the pin relative to the tubular rivet beyond that necessary to set the tubular rivet properly.

The foregoing objects, advantages, features and results of the present invention, together with various other objects, advantages, features and results thereof which will be evident to those skilled in the art to which the invention relates in the light of this disclosure, may be achieved with the exemplary embodiments of the invention described in detail hereinafter and illustrated in the accompanying drawings.

Description of drawings

In the drawings:

FIG. 1 is a longitudinal sectional view of a tubular rivet embodying the invention;

FIG. 2 is a side elevational view of a locking collar for use with the tubular rivet of FIG. 1;

FIG. 3 is a fragmentary longitudinal sectional view showing the locking collar of FIG. 2 installed in the tubular rivet of FIG. 1;

FIGS. 4, 5 and 6 are views respectively corresponding to FIGS. 1, 2 and 3, but illustrating a slightly different embodiment of the invention;

FIG. 7 is a fragmentary side elevational view of a pull pin for setting the tubular rivet of either the rivet-collar combination of FIG. 3, or that of FIG. 6;

FIG. 8 is a longitudinal sectional view showing a complete blind rivet assembly of the invention, incorporating the pin of FIG. 7 and either the collar-rivet combination of FIG. 3, or that of FIG. 6, about to be set in holes through workpieces to be riveted together;

FIG. 9 is a view similar to FIG. 8, but showing the blind rivet assembly partially set;

FIG. 10 is a view similar to FIG. 9, but showing the blind rivet assembly fully set, FIG. 10 also showing the minimum grip length achievable with the assembly;

FIG. 11 is a view similar to FIG. 10, but illustrating the maximum grip length achievable with the blind rivet assembly of the invention;

FIG. 12 is a longitudinal sectional view showing another embodiment of the blind rivet assembly of the invention in position to be set in holes through workpieces to be riveted together;

FIGS. 13 to 15 are views similar to FIG. 12, but showing successive steps in the setting of the blind rivet assembly of FIG. 12;

FIG. 16 is a view similar to FIGS. 12 to 15, but showing the blind rivet assembly thereof fully set;

FIG. 17 is a longitudinal sectional view showing still another embodiment of the blind rivet assembly of the invention;

FIGS. 18 and 19 are views similar to FIG. 17, but showing successive steps in the setting of the blind rivet assembly of FIG. 17 in holes through workpieces to be riveted together; and FIG. 20 is a view similar to FIGS. 17 to 19, but showing the blind rivet assembly thereof fully set.

*Detailed description of preferred embodiments of invention*

Referring initially to FIGS. 1 to 3 of the drawings, and particularly to FIG. 3, illustrated therein is a tubular rivet 20 which includes a sleeve 22 having a head 24 at one end. The head 24 provides an external annular shoulder 26 which faces generally toward the other, blind end of the sleeve 22.

Within the head 24 is an internal annular recess having the form of an internal annular groove 28 which includes a relatively deep portion 30 adjacent the accessible or outer end surface 32 of the head. The portion 30 of the groove 28 provides an annular shoulder 34 axially spaced from and generally parallel to the end surface 32 of the head 24. The groove 28 also includes a shallow portion 36 spaced from the end surface 32 of the head 24.

As shown in FIG. 3, within the internal annular groove 28 in the head 24 of the rivet 20 is a locking collar 40 having approximately the same cross sectional configuration as the groove itself. More particularly, the locking collar 40 has a portion 42 seated against the annular shoulder 34 within the head 24 of the rivet 20, and, similarly, has other portions seated against the remaining walls of the deep and shallow portions 30 and 36 of the internal annular groove 28. In other words, the outside diameter of each portion of the locking collar 40 is at least substantially equal to the diameter of the corresponding portion of the internal annular groove 28. Thus, the locking collar 40 completely fills the various portions of the groove 28. The locking collar 40 has an axial hole 44 therethrough of a diameter to receive a pin 50 to be described hereinafter.

Considering the manner in which the locking collar 40 is inserted into the internal annular groove 28 into the position shown in FIG. 3, the tubular rivet 20 is initially formed as shown in FIG. 1, the head 24 being provided with a bore 52 in the end surface 32 thereof having the same diameter as the deep portion 30 of the groove 28. This bore 52 is encircled by an axially extending, annular flange 54. To assemble the tubular rivet 20 and the locking collar 40, the latter is inserted into the bore 52, and the annular flange 54 is then swaged inwardly, as by spinning, to obtain the relationship illustrated in FIG. 3.

In FIGS. 4 to 6 of the drawings is illustrated another embodiment which is very similar to that shown in FIGS. 1 to 3, corresponding parts being identified by numerals higher by one hundred than the numerals used in FIGS. 1 to 3. In the embodiment of FIGS. 4 to 6, the tubular rivet 120 is initially formed in its final configuration, as shown in FIG. 4. The locking collar 140 is diagonally split on one side, as indicated at 152, so that it can be collapsed to reduce its outside diameter, as designated by the dimensional arrow 154 in FIG. 5, to a value slightly less than the inside diameter of the sleeve 122, designated by the arrow 156 in FIG. 4. Thus, the locking collar 140 can be inserted into the internal groove 128 through the blind end of the sleeve 122, whereupon the locking collar will assume the position and configuration of FIG. 6.

It will be noted that the structures of FIGS. 3 and 6 are identical, except for the diagonal split 152 in the locking collar 140. However, this diagonal split performs no function after the insertion of the locking collar 140 into the internal annular groove 128 in the head 124 of the tubular rivet 120. Once the locking collars 40 and 140 have been inserted into the internal annular grooves 28 and 128 in the tubular rivets 20 and 120, respectively, the two collar-rivet combinations thus far described function identically. Consequently, only the rivet-collar combination 20–40 will be considered hereinafter.

Turning to FIGS. 7 and 8 of the drawings, the pin 50 extends through the tubular rivet 20, and through the locking collar 40 therein, and is provided on the accessible side of the tubular rivet with suitable grippable means 60 engageable by a pull-type gripping means 62 of a riveting tool 64 having a pressure nose 66 seatable against the accessible end surface 32 of the head 24.

The pin 50 is provided at the opposite end thereof from the grippable means 60 with an expanding and enlarging means 70 and 72 for respectively expanding the sleeve 22 into engagement with the peripheries of holes through workpieces 74 to be riveted together and for enlarging the blind end of the sleeve 22, as by bulbing it, to cause it to seat against the blind side of the workpiece assembly. The expanding means 70 includes a shank 76 on the pin 50 which is of larger diameter than the pin itself. The enlarging means 72, which is a bulbing means in the particular construction illustrated, comprises a head 78 on the shank 76 which is of larger diameter than the shank itself. The shank 76 is joined to the pin 50 by a tapered annular shoulder 80 converging from the shank toward the accessible end of the pin. Similarly, the head 78 is joined to the shank 76 by a tapered annular shoulder 82 also converging toward the accessible end of the pin 50. The pin 50 is intended to break at the junction 84 of the tapered annular shoulder 80 with the pin, when the tubular rivet 20 has been set. This is shown in FIGS. 10 and 11 of the drawings. To insure breaking of the pin 50 at the point 84, it may be provided with a breakneck, not shown, at this point.

The tapered annular shoulder 80 joining the shank 76 to the pin 50 is provided therein with an external annular groove 86 which, as shown in FIGS. 10 and 11, registers with the internal annular groove 28 in the head 24 of the tubular rivet 20 when the latter is set. Under these conditions, the material of the locking collar 40, which is more deformable or malleable than the material or materials of the tubular rivet 20 and the pin 50, is deformed into both the internal annular groove 28 in the tubular rivet and the external annular groove 86 in the pin. The volume of the locking collar 40 is so selected that it is substantially equal to the sum of the volumes of the two grooves 28 and 86. Thus, under the conditions shown in FIGS. 10 and 11 of the drawings, the material of the locking collar 40 completely fills the grooves 28 and 86 to positively lock the pin 50 to the tubular rivet 20, and to prevent further axial movement of the pin relative to the tubular rivet, with the result that the pin breaks at the point 84.

Considering the operation of the invention in a little more detail, and initially comparing FIG. 9 to FIG. 8, as the pin 50 is pulled axially of the tubular rivet 20, the shank 76 first expands the sleeve 22 into engagement with the workpieces 74. When the tapered annular shoulder 82 enters the blind end of the sleeve 22, it enlarges or bulbs same into seating engagement with the blind side of the workpieces. Comparing FIG. 10 to FIG. 9, as the external annular groove 86 in the tapered annular shoulder 80 begins to register with the internal annular groove 28 in the tubular rivet 20, the material of the locking collar 40 begins to flow into the groove 86. This continues as axial movement of the pin 50 is continued until the groove 86 is completely filled. At this point, the pin 50 is positively and reliably locked to the tubular rivet 20, since both the groove 28 in the tubular rivet and the groove 86 in the pin are completely filled. At the same time, further axial movement of the pin 50 relative to the tubular rivet 20 is prevented, whereupon the pin breaks at the point 84. It will be noted that the portion 42 of the locking collar 40 is at all times seated against the shoulder 34 of the groove 28, and that the pin 50 at all times engages the inner periphery of the shoulder 34. This insures confining the material of the locking collar 40 within the registering grooves 28 and 86.

It will be noted that when the pin 50 and the tubular rivet 20 reach the relative final positions shown in FIG. 10, the total of the volumes of the grooves 28 and 86 and the volume of the locking collar 40 are equal, whereupon the material of the locking collar completely fills the grooves. This insures a positive lock, and further insures breakage of the pin at the point 84 at the instant that the tubular rivet is fully set.

As will be seen by comparing FIG. 11 to FIG. 10, the head 78 of the pin 50 is capable of deforming axially to accommodate workpieces 92 having a greater total thickness than the workpieces 74, the taper of the annular shoulder 82 permitting such axial deformation. FIG. 10 represents approximately the minimum grip lengths of which the particular embodiment of the invention disclosed is capable, while FIG. 11 represents approximately the maximum grip length of which this same embodiment is capable. It will be noted that in either instance, breaking of the pin 50 occurs at relative positions of the pin and the tubular rivet 20 such that the grooves 28 and 86 are in register and are substantially completely filled with the material of the locking collar 40. Thus, regardless of the grip length, the locking collar controls the setting of the tubular rivet.

Turning now to FIGS. 12 to 16 of the drawings, illustrated therein is a blind rivet assembly comprising a tubular rivet 220 and a pull-type rivet-setting pin 250 respectively corresponding to the tubular rivet 20 and the pin 50. The tubular rivet 220 includes a sleeve 222 having a head 224 at one end, such head providing an external annular shoulder 226 which faces toward the other, blind end of the sleeve.

Within the head 224 is an internal annular recess 228 formed in the accessible or outer end surface 232 of the head. More particularly, the internal annular recess 228 includes a cylindrical portion 234 formed in the end surface 232 of the head 224, and includes a tapered portion 236 converging toward the blind end of the sleeve 222. The cylindrical and tapered portions 234 and 236 provide an annular seat 238 at their junction, such annular seat facing axially in the same direction as the end surface 232 of the head 224.

Encircling the pin 250 and extending radially outwardly into the internal annular recess 228 is a locking collar 240 formed of a permanently deformable material and having approximately the same external configuration as the recess 228 itself. More particularly, the locking collar 240 has an axial bore 242 therethrough which is slightly larger than and receives the pin 250. The locking collar 240 is provided at its outer end with an annular flange 244 receivable in the cylindrical portion 234 of the recess 228 and ultimately engageable with the annular seat 238. The locking collar 240 further includes a tapered portion 246 conforming approximately to the tapered portion 236 of the recess 228. The locking collar 240 terminates at its inner end in a cylindrical portion 248 receivable between the pin 250 and the sleeve 222 of the tubular rivet 220.

As shown in FIG. 12 of the drawings, initially the locking collar 240 is merely pressed lightly into the interior of the sleeve 222 and into the internal annular recess 228. Thus, the annular flange 244 is not seated on the annular seat 238 and projects axially outwardly beyond the end surface 232 of the head 224 slightly.

The pin 250 extends through the tubular rivet 220, and through the locking collar 240 therein, and is provided at the accessible end of the tubular rivet with suitable grippable means 260 engageable by a pull-type gripping means 262 of a riveting tool 264 having a pressure nose 266 initially seatable against the annular flange 244 on the locking collar 240, and ultimately seatable against the accessible end surface 232 of the head 244.

The pin 250 is provided at the opposite end thereof from the grippable means 260 with expanding means and enlarging means 270 and 272, the former being capable of expanding the sleeve 222 into engagement with the peripheries of holes through workpieces 274 to be riveted together, and the latter being capable of enlarging the blind end of the sleeve to cause it to seat against the blind side of the workpiece assembly. The expanding means 270 includes a shank 276 on the pin 250 which is of larger diameter than the pin itself. The enlarging means 272, which is a bulbing means in the particular construction illustrated, comprises a head 278 on the shank 276 which is of larger diameter than the shank itself. The shank 276 is joined to the pin 250 by a tapered annular shoulder 280 converging from the shank toward the accessible end of the pin. Similarly, the head 278 is joined to the shank 276 by a tapered annular shoulder 282 also converging toward the accessible end of the pin 250. The pin 250 is intended to break at the junction 284 of the tapered annular shoulder 280 with the pin, when the tubular rivet 220 has been set, as shown in FIG. 16 of the drawings. To insure breakage of the pin 250 at the point 284, it may be provided with a breakneck, not shown, at such point.

The tapered annular shoulder 280 joining the shank 276 to the pin 250 is provided therein with an external annular groove 286 which, as shown in FIG. 16, registers with the internal annular recess 228 in the head 224 of the tubular rivet 220 when the latter is fully set. Under these conditions, the material of the locking collar 240, which is more deformable or malleable than the material or materials of the tubular rivet 220 and the pin 250, is deformed into both the internal annular recess 228 in the tubular rivet and the external annular groove 286 in the pin. The volume of the locking collar 240 is substantially equal to the total of the volumes of the internal annular recess 228 and the external annular groove 286. Thus, under the conditions shown in FIG. 16 of the drawings, the material of the locking collar 240 completely fills the recess 228 and the groove 286 to positively lock the pin 250 to the tubular rivet 220, and to prevent further axial movement of the pin relative to the tubular rivet, with the result that the pin breaks at the point 284.

Explaining the operation of the embodiment of the invention under consideration in a little more detail, and initially comparing FIG. 13 to FIG. 12, as the gripping means 262 of the riveting tool 264 begins to pull the pin 250 axially of the tubular rivet 222, the pressure nose 266 presses the locking collar 240 axially into the tubular rivet until the annular flange 244 on the locking collar is seated against the annular seat 238. At this stage, the locking collar 240 completely fills the internal annular recess 228 and the pressure nose 266 engages the end surface 234 of the head 224 of the tubular rivet. This condition is shown in FIG. 13 of the drawings.

Comparing FIG. 14 to FIG. 13, further pulling of the pin 250 axially of the tubular rivet 220 results in progressive expansion of the sleeve 222 into engagement with the peripheries of the holes through the workpieces 274, and results in progressive enlarging or bulbing of the blind end of the sleeve 222 into engagement with the blind side of the workpieces. At the same time, the inner end of the locking collar 240 begins to deform into the external annular groove 286 in the tapered annular shoulder 280.

Comparing FIG. 15 to FIG. 14, the progressive operations of expanding the sleeve 222, bulbing the inner end of the sleeve, and deforming the inner end of the locking collar 240 into the annular groove 286, are further along, and nearly completed.

Comparing FIG. 16 to FIG. 15, the pin 250 has been pulled axially relative to the tubular rivet 220 sufficiently to complete the expansion of the sleeve 222 and the bulbing of the sleeve against the blind side of the workpieces 274. Also, the locking collar 240 has been deformed into the external annular groove 286 in the pin 250 sufficiently to completely fill both this groove and the internal annular recess 228 in the tubular rivet 220. At this point, the pin 250 is positively and reliably locked to the tubular rivet 220, so that any further axial movement of the pin relative to the tubular rivet is prevented, whereupon the pin breaks at the point 284.

It will be noted that when the pin 250 and the tubular rivet 220 reach the final relative positions shown in FIG. 16, the total of the volumes of the recess 228 and the groove 286 and the volume of the locking collar 240 are equal, so that the material of the locking collar completely fills such recess and groove. This insures a positive lock, and further insures breakage of the pin at the point 284 at the instant that the tubular rivet is fully set. Thus, the locking collar 240 determines the fully set condition of the tubular rivet 220, which is an important feature.

Turning now to FIGS. 17 to 20 of the drawings, illustrated therein is a blind rivet assembly comprising a tubular rivet 320 and a pull-type rivet-setting pin 350 respectively corresponding to the tubular rivet 20 and the pin 50. The tubular rivet 320 includes a sleeve 322 having a head 324 at one end, such head providing an external annular shoulder 326 which faces toward the other, blind end of the sleeve.

Within the head 324 is an internal annular recess 328 formed in the accessible or outer end surface 332 of the head. More particularly, the internal annular recess 328 includes an outer tapered portion 334 formed in the end surface 332 of the head 324, and further includes an inner tapered portion 336, both such portions converging toward the blind end of the sleeve 322, and the included angle of the inner portion being greater than that of the outer. The tapered portions 334 and 336 provide an annular seat 338 at their junction, such annular seat facing axially in the same direction as the end surface 332 of the head 324.

Encircling the pin 350 and extending radially outwardly into the outer tapered portion 334 of the internal annular recess 328 is a locking collar 340 formed of a permanently deformable material and having an external taper slightly less than the taper of the outer tapered portion 334. More particularly, the locking collar 340 has an axial bore 342 therethrough which is slightly larger than and receives the pin 350. As shown in FIG. 17, the outer end of the locking collar 340 initially extends axially outwardly beyond the outer end surface 332 of the head 324, and the inner end thereof is seated on the annular seat 338. Initially the locking collar 340 is merely pressed lightly into the outer tapered portion 334 of the internal annular recess 328.

The pin 350 extends through the tubular rivet 320, and through the locking collar 340 therein, and is provided at the accessible end of the tubular rivet with suitable grippable means 360 engageable by a pull-type gripping means, not shown, of a riveting tool 364 having a pressure nose 366 initially seatable against the outer end of the locking collar 340, and ultimately seatable against the accessible end surface 322 of the head 344.

The pin 350 is provided at the opposite end thereof from the grippable means 360 with expanding means and enlarging means 370 and 372, the former being capable of expanding the sleeve 322 into engagement with the peripheries of holes through workpieces 374 to be riveted together, and the latter being capable of enlarging the blind end of the sleeve to cause it to seat against the blind side of the workpiece assembly. The expanding means 370 includes a shank 376 on the pin 350 which is of larger diameter than the pin itself. The enlarging means 372, which is a bulbing means in the particular construction illustrated, comprises a head 378 on the shank 376 which is of larger diameter than the shank itself. The shank 376 is joined to the pin 350 by a varying-taper tapered annular shoulder 380 converging from the shank toward the accessible end of the pin. Similarly, the head 378 is joined to the shank 376 by a tapered annular shoulder 382 also converging toward the accessible end of the pin 350. The pin 350 is intended to break at the junction 384 of the tapered annular shoulder 380 with the pin, when the tubular rivet 320 has been set, as shown in FIG. 20 of the drawings. To insure breakage of the pin 350 at the point 384, it may be provided with a breakneck, not shown, at such point.

The varying-taper tapered annular shoulder 380 joining the shank 376 to the pin 350 is provided therein with an external annular groove 386 which, as shown in FIG. 20, registers with the internal annular recess 328 in the head 324 of the tubular rivet 320 when the latter is fully set. Under these conditions, the material of the locking collar 340, which is more deformable or malleable than the material or materials of the tubular rivet 320 and the pin 350, is deformed into both the internal annular recess 328 in the tubular rivet and the external annular groove 386 in the pin. The volume of the locking collar 340 is substantially equal to the total of the volumes of the internal annular recess 328 and the external annular groove 386. Thus, under the conditions shown in FIG. 20 of the drawings, the material of the locking collar 340 completely fills the recess 328 and the groove 386 to positively lock the pin 350 to the tubular rivet 320, and to prevent further axial movement of the pin relative to the tubular rivet, with the result that the pin breaks at the point 384.

Explaining the operation of the embodiment of the invention under consideration in a little more detail, as the gripping means of the riveting tool 364 begins to pull the pin 350 axially of the tubular rivet 322, the pressure nose 366 first presses against the locking collar 340 without engaging the outer end surface 332 of the head 324. Such pressure causes the locking collar 340 to completely fill the outer tapered portion 334 of the internal annular recess 328. This condition is shown in FIG. 18 of the drawings.

Comparing FIG. 19 to FIG. 18, pulling of the pin 350 axially of the tubular rivet 320 results in progressive expansion of the sleeve 322 into engagement with the peripheries of the holes through the workpieces 374, and results in progressive enlarging or bulbing of the blind end of the sleeve 322 into engagement with the blind side of the workpieces. At the same time, the inner end of the locking collar 340 begins to deform into the external annular groove 386 in the tapered annular shoulder 380, as the pressure nose 366 presses the locking collar farther into the internal annular recess 328.

Comparing FIG. 20 to FIG. 19, the pin 350 has been pulled axially relative to the tubular rivet 320 sufficiently to complete the expansion of the sleeve 322 and the bulbing of the sleeve against the blind side of the workpieces 374. Also, the locking collar 340 has been deformed into the external annular groove 386 in the pin 350 sufficiently to completely fill both this groove and the internal annular recess 328 in the tubular rivet 320, the pressure nose 366 now being seated against the outer end surface 332 of the head 324. At this point, the pin 350 is positively and reliably locked to the tubular rivet 320, so that any further axial movement of the pin relative to the tubular rivet is prevented, whereupon the pin breaks at the point 384.

It will be noted that when the pin 350 and the tubular rivet 320 reach the final relative positions shown in FIG. 20, the total of the volumes of the recess 328 and the groove 386 and the volume of the locking collar 340 are equal, so that the material of the locking collar completely fills such recess and groove. This insures a positive lock, and further insures breakage of the pin at the point 384 at the instant that the tubular rivet is fully set. Thus, the locking collar 340 determines the fully set condition of the tubular rivet 320, which is an important feature.

In general, the previous description of the embodiments of FIGS. 1 to 11 of the drawings is also applicable to the embodiment of FIGS. 12 to 16 and the embodiment of FIGS. 17 to 20, so that a further description of the embodiments of FIGS. 12 to 20 is unnecessary.

Although exemplary embodiments of the invention have been disclosed herein for purposes of illustration, it will be understood that various changes, modifications and substitutions may be incorporated in such embodiments without departing from the spirit of the invention as defined by the claims which follow.

We claim as our invention:

1. In a blind rivet assembly, the combination of:
   (A) a tubular rivet capable of permanent deformation and including:
       (a) a sleeve provided with a rivet head at one end thereof,
       (b) said rivet head being provided with an end surface and being provided with an external annular shoulder which is spaced from and faces away from said end surface of said rivet head and which faces toward the other end of said sleeve, and
       (c) said rivet head having an internal annular groove therein which is intermediate and spaced from said end surface of said rivet head and said annular shoulder thereon, and which is separated from said end surface by an internal flange on said rivet head;
   (B) a pin extending through said tubular rivet and having:
       (a) grippable means at one end of said pin and adjacent said rivet head,
       (b) expanding and enlarging means, at the other end of said pin and adjacent said other end of said sleeve, for expanding said tubular rivet and for enlarging said other end of said sleeve, in response to axial movement of said pin relative to said tubular rivet in a direction to move said expanding and enlarging means toward said head, and
       (c) an external annular groove adjacent the junction of said expanding and enlarging means with said pin; and
   (C) a separate, ring-like collar of permanently deformable material,
       (a) said collar encircling said pin and being preset in said internal annular groove in said rivet head and being retained in said internal annular groove by said internal flange on said rivet head,
       (b) the volume of said collar being equal to the sum of the volumes of said internal annular groove in said rivet head and said external annular groove in said pin, and
       (c) said collar being deformable into and adapted to completely fill said internal annular groove in said rivet head and said external annular groove in said pin when said pin is displaced axially relative to said tubular rivet sufficiently to register said external annular groove in said pin with said internal annular groove in said rivet head.

2. In a blind rivet assembly, the combination of:
   (A) a tubular rivet capable of permanent deformation and including:
       (a) a sleeve provided with a rivet head at one end thereof,
       (b) said rivet head being provided with an end surface and being provided with an external annular shoulder which is spaced from and faces away from said end surface and which faces toward the other end of said sleeve, and
       (c) said rivet head having an internal annular groove therein which is separated from said end surface by an internal annular flange;
   (B) a pin extending through said tubular rivet and having:
       (a) grippable means at one end of said pin and adjacent said rivet head,
       (b) expanding and enlarging means, at the other end of said pin and adjacent said other end of said sleeve, for expanding said tubular rivet and for enlarging said other end of said sleeve, in response to axial movement of said pin relative to said tubular rivet in a direction to move said expanding and enlarging means toward said rivet head,
       (c) said expanding and enlarging means being capable of permanent deformation and including a rivet-expanding shank of a diameter greater than the inside diameter of said sleeve, but less than the outside diameter of said sleeve,
       (d) said shank and said pin being joined by a first tapered annular shoulder converging from said shank toward said one end of said pin,
       (e) said first tapered annular shoulder having an external annular groove therein,
       (f) said expanding and enlarging means also including a sleeve-enlarging head of a diameter substantially equal to the outside diameter of said sleeve, and
       (g) said sleeve-enlarging head and said shank being joined by a second tapered annular shoulder converging from said sleeve-enlarging head toward said shank; and
   (C) a separate collar of permanently deformable material preset in said internal annular goove in said rivet head and retained therein by said internal annular flange on said rivet head,
       (a) said collar encircling said pin,
       (b) the volume of said collar being equal to the sum of the volumes of said internal annular groove in said rivet head and said external annular groove in said first tapered annual shoulder, and
       (c) said collar being deformable into and adapted to completely fill said internal annular groove in said rivet head and said external annular groove in said first tapered annular shoulder when said pin is displaced axially relative to said tubular rivet sufficiently to register said external anular groove in said first tapered annular shoulder with said internal annular recess in said rivet head.

3. In combination in a blind rivet assembly having a variable grip length:
   (A) a tubular rivet capable of permanent deformation and including:
       (a) a sleeve provided with a rivet head at one end thereof,
       (b) said rivet head providing an external annular shoulder which faces the other end of said sleeve, and
       (c) said rivet head having an internal annular recess therein;
   (B) a pin extending through said tubular rivet and having,
       (a) grippable means at one end of said pin and adjacent said rivet head,
       (b) expanding and enlarging means, at the other end of said pin and adjacent said other end of said sleeve, for expanding said tubular rivet and for enlarging said other end of said sleeve, in response to axial movement of said pin relative to said tubular rivet in a direction to move said expanding and enlarging means toward said rivet head,
       (c) said expanding and enlarging means being capable of permanent deformation and including a rivet-expanding shank of a diameter greater than the inside diameter of said sleeve, but not greater than the outside diameter of said sleeve,
  (d) said shank and said pin being joined by a tapered annular shoulder converging from said shank toward said one end of said pin, and
  (e) said tapered annular shoulder having an external annular groove therein;
(C) a collar of permanently deformable material,
  (a) said collar encircling said pin and extending radially outwardly into said internal annular recess in said rivet head,
  (b) the volume of said collar being equal to the sum of the volumes of said internal annular recess in said rivet head and said external annular groove in said tapered annular shoulder, and
  (c) said collar being deformable into and adapted to completely fill said internal annular recess in said rivet head and said external annular groove in said tapered annular shoulder when said pin is displaced axially relative to said tubular rivet sufficiently to register said external annular groove in said tapered annular shoulder with said internal annular recess in said rivet head; and
(D) means for progressively deforming said collar into said external annular groove in said tapered annular shoulder, as said external annular groove registers with said internal annular recess in said rivet head in response to continued axial displacement of said pin relative to said tubular rivet, until said collar completely fills said internal annular recess and said external annular groove, whereupon said collar terminates said axial displacement of said pin relative to said tubular rivet.

4. In a blind rivet assembly having a variable grip length, the combination of:
(A) a tubular rivet capable of permanent deformation and including:
  (a) a sleeve provided with a rivet head at one end thereof, and
  (b) said rivet head providing an external annular shoulder which faces the other end of said sleeve;
(B) a pin extending through said tubular rivet and having:
  (a) grippable means at one end of said pin and adjacent said rivet head,
  (b) expanding and enlarging means, at the other end of said pin and adjacent said other end of said sleeve, for expanding said tubular rivet and for enlarging said other end of said sleeve, in response to axial movement of said pin relative to said tubular rivet in a direction to move said expanding and enlarging means toward said rivet head,
  (c) said expanding and enlarging means being capable of permanent deformation and including a rivet-expanding shank of a diameter greater than the inside diameter of said sleeve, and
  (d) said shank and said pin being joined by a tapered annular shoulder converging from said shank toward said one end of said pin; and
(C) setting stopping means independent of expansion of said tubular rivet and of enlargement of said other end of said sleeve, for terminating axial movement of said pin relative to said tubular rivet when said pin reaches a predetermined axial position relative to said tubular rivet, set setting stopping means including:
  (a) an internal annular recess in said rivet head,
  (b) an external annular groove in said tapered annular shoulder, and
  (c) a collar of permanently deformable material encircling said pin and extending radially outwardly into said internal annular recess in said rivet head,
  (d) the volume of said collar being equal to the sum of the volumes of said internal annular recess in said rivet head and said external annular groove in said tapered annular shoulder, and
  (e) said collar being progressively deformable into and adapted to completely fill said internal annular recess in said rivet head and said external annular groove in said tapered annular shoulder in response to continued axial displacement of said pin relative to said tubular rivet sufficient to register said external annular groove in said tapered annular shoulder with said internal annular recess in said rivet head, whereupon said collar terminates said axial displacement of said pin relative to said tubular rivet irrespective of the action of said expanding and enlarging means.

References Cited

UNITED STATES PATENTS

| | | | |
|---|---|---|---|
| 2,501,567 | 3/1950 | Huck | 85—78 |
| 3,038,626 | 6/1962 | Simmons | 85—78 |
| 3,107,572 | 10/1963 | Orloff | 85—70 |
| 3,285,121 | 11/1966 | Siebol | 85—72 |
| 3,292,482 | 12/1966 | Fry et al. | 85—78 |

FOREIGN PATENTS

| | | |
|---|---|---|
| 1,254,584 | 1/1961 | France. |

MARION PARSONS, Jr., *Primary Examiner.*